(12) United States Patent
Heinrich et al.

(10) Patent No.: US 7,814,611 B2
(45) Date of Patent: Oct. 19, 2010

(54) WIPER BLADE

(75) Inventors: Laurent Heinrich, Illkirch-Graffenstaden (FR); Kurt Muehlpforte, Buehl (DE); Jan Dietrich, Buehl (DE); Gundolf Surkamp, Calafell-Tarragona (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/357,954

(22) Filed: Jan. 22, 2009

(65) Prior Publication Data

US 2009/0126140 A1     May 21, 2009

Related U.S. Application Data

(63) Continuation of application No. 10/519,728, filed as application No. PCT/DE03/001638 on May 20, 2003, now Pat. No. 7,546,660.

(30) Foreign Application Priority Data

Jun. 28, 2002   (DE) ................. 102 29 608
Dec. 19, 2002   (DE) ................. 102 59 480

(51) Int. Cl.
   *B60S 1/40*   (2006.01)
   *B60S 1/38*   (2006.01)

(52) U.S. Cl. ............. 15/250.32; 15/250.43; 15/250.201

(58) Field of Classification Search ............. 15/250.32, 15/250.43, 250.44, 250.361, 250.201, 250.351
See application file for complete search history.

(56) References Cited

U.S. PATENT DOCUMENTS

| 4,094,038 A | 6/1978 | Hancu |
| 4,118,825 A | 10/1978 | Hoebrechts et al. |
| 4,416,032 A | 11/1983 | Mohnach et al. |
| 4,446,589 A | 5/1984 | Maiocco |
| 5,946,764 A * | 9/1999 | Tworzydlo ............. 15/250.201 |
| 6,158,078 A | 12/2000 | Kotlarski |
| 6,295,690 B1 | 10/2001 | Merkel et al. |
| 6,499,181 B1 | 12/2002 | Kotlarski |
| 7,293,321 B2 | 11/2007 | Breesch |
| 7,546,660 B2 * | 6/2009 | Heinrich et al. ......... 15/250.201 |

FOREIGN PATENT DOCUMENTS

| DE | 2830508 A1 | 1/1980 |
| DE | 4413661 A1 | 11/1994 |
| DE | 19924662 A1 | 11/2000 |
| DE | 10000374 A1 | 7/2001 |
| DE | 10036135 A1 | 2/2002 |
| FR | 2219860 * | 9/1974 |
| JP | 49084826 | 7/1974 |
| JP | 53061934 | 5/1978 |
| JP | 60069758 | 5/1985 |
| WO | 84/00523 * | 2/1984 |
| WO | 0240329 | 5/2002 |

* cited by examiner

*Primary Examiner*—Gary K Graham
(74) *Attorney, Agent, or Firm*—Michael Best & Friedrich LLP

(57) ABSTRACT

This invention relates to a wiper blade (20) having a connecting part (32) which is mounted on a carrying element (24) of the wiper blade (20) and has a pivot pin (42, 96, 106, 138, 146, 164, 178) of a joint (30) whose free end is connected to a wiper rod (28, 70, 80, 90, 118, 136, 150). It is proposed that the joint (30) includes a cap (54, 114, 128, 160, 190) which covers the connecting part (32) and is attached to it, and during operation the wiper blade (20) and the wiper rod (28, 70, 80, 90, 118, 136, 150) are secured in the installed position.

10 Claims, 9 Drawing Sheets

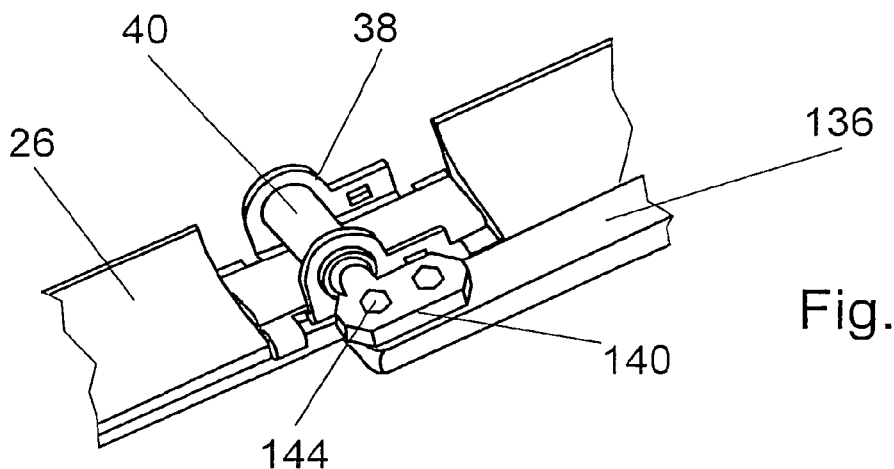
Fig. 15
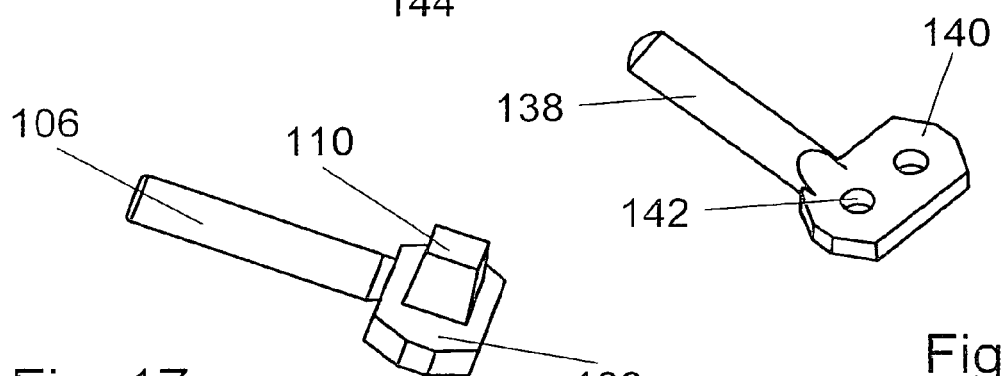
Fig. 16
Fig. 17
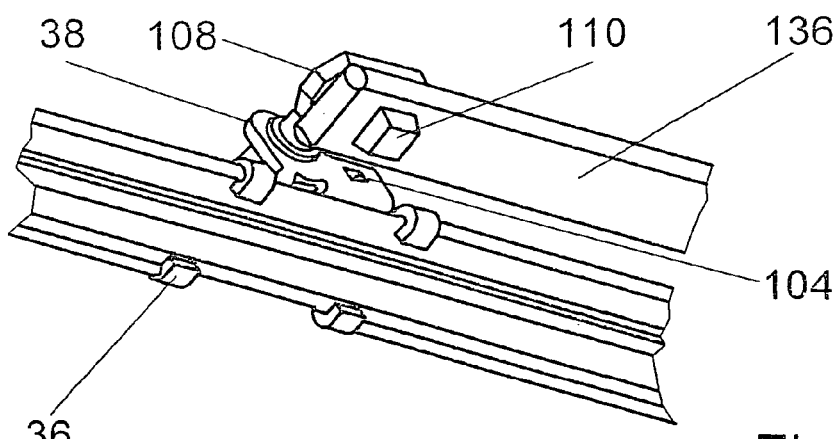
Fig. 18

WIPER BLADE

CROSS-REFERENCE TO RELATED APPLICATIONS

This application is a continuation of and claims priority to U.S. patent application Ser. No. 10/519,728, filed on Dec. 28, 2004, which is a national stage filing under 35 U.S.C. 371 of International Application No. PCT/DE2003/001638, filed May 20, 2003, which claims foreign priority to German Patent Application No. 10229608.1, filed Jun. 28, 2002, and German Patent Application No. 10259480.5, filed Dec. 19, 2002, the disclosures of all of which are hereby incorporated by reference herein in their entireties. Priority to each application is hereby claimed.

BACKGROUND OF THE INVENTION

Known windshield wipers have a wiper arm sitting on a wiper shaft which is driven by a wiper motor. A wiper blade is connected to the free end of the wiper arm in an articulated joint. It usually has a multisection bracket system with a central bracket to which are hinge-connected subordinate brackets, at least some of which hold a wiper strip with claws at their ends. Wiper blades without a joint are also known; instead of the supporting bracket system, these have an elastic carrying element that is made of plastic and is resilient in the direction perpendicular to the windshield. To improve the spring property, it may have at least one spring bar made of spring steel. In the unloaded state, the carrying element has a greater curvature than the windshield, so the wiper strip is in contact with the windshield with a suitable pressure distribution under the pressing force of the wiper arm.

Unarticulated wiper blades have a very low design, which is highly advantageous with regard to their hydrodynamic properties and the noise generated in the slip stream from driving. German Patent 199 24 662 A1 describes a windshield wiper having an unarticulated wiper blade which is connected to a wiper arm in an articulated joint using a so-called sidelock system comprising a two-part connecting piece, the first part of which has a block section with a bearing bore and surrounds the spring strips, which serve as the carrying element, laterally and from beneath with integrally form-fitting elements. The second part is attached to the free end of the wiper arm which has a U-shaped profile that is open toward the windshield. A pin is inserted laterally into the second part so that it runs across the longitudinal direction of the wiper arm and points toward the wiper blade; the pin is then pivotably mounted in the bearing bore of the first part of the connecting piece.

A bridge is arranged on the second part of the connecting piece in parallel with the pin and offset in the longitudinal direction, this bridge being bent at its free end toward the side of the pin. In an assembly position in which the wiper blade is held across the longitudinal direction of the wiper arm, the pin may be pushed into the bearing bore of the connecting part. When the wiper blade is then rotated in parallel with the longitudinal direction of the wiper arm, the bridge extends beyond the wiper blade and locks it at its bent end, so that lateral guide faces of the block-shaped section of the first part of the connecting piece are guided in the installed state between the bent end of the bridge and an opposing face of the second part. In the operating position of the wiper blade, the bridge dips into a corresponding groove of the first part and is approximately flush with its top side. For dismantling, the wiper blade must be pivoted in the opposite direction until the bent end is disengaged and the wiper blade can be pulled away from the pin.

German Patent 28 30 508 A1 describes a wiper device for automotive windshields which has a wiper blade to which a pivot pin is fixedly connected. The pivot pin runs in a plane which is essentially parallel to the windshield, and the pivot pin is rotatably mounted in a bearing bore in the wiper arm. In order for the pivot pin not to slip out of the bearing bore during a wiping movement, the wiper blade is locked in the axial direction of the pivot pin with respect to the wiper arm by the fact that a projecting shoulder in an extension of the wiper arm engages in a groove in the protrusion which is fixedly connected to the wiper blade at the side of the blade. The outside flank of the groove forms a shoulder against which the protrusion is in contact in the operating position and thus locks the wiper blade axially to the pivot pin.

SUMMARY OF THE INVENTION

According to this invention, the joint includes a cap which covers and is attached to the connecting part. During operation the cap covers the wiper blade and the wiper rod in the installed position. This yields a very shallow connection between a preferably unarticulated wiper blade and a wiper rod, with the connecting parts for left-hand steering vehicles being the same as those for right-hand steering vehicles. Only the wiper rod is designed in mirror image. The inventive design permits numerous variants with free room for design innovation, so that the wiper blade can be adapted to numerous models of vehicles. The wiper rod itself can be kept simple because most functions used for adapting a windshield wiper to a motor vehicle are concentrated on the connecting part and the pivot pin.

The cap expediently has a pocket on its side facing the wiper rod; this pocket is open toward the windshield and toward the wiper rod in the longitudinal direction of the wiper rod and extends beyond it laterally. The pocket may be situated in the extension of the wiper rod, so that in the operating position, an extension of the wiper rod beyond the pivot pin, engages in the pocket of the cap. The pocket may also be situated in front of the pivot pin as seen in the longitudinal direction from the drive side of the wiper rod, whereby it includes the wiper rod on the drive side to the pivot pin. The cap and the wiper rod may therefore be shorter.

When the wiper rod is pivoted by approximately 90° in relation to the wiper rod, the extension of the wiper rod and/or the wiper rod itself comes out of the pocket and the wiper rod can be bent by the pivot pin attached to the wiper rod. Assembly then takes place in the opposite direction.

Instead of a pocket, the cap may have a guide pin, which is guided in a fork at the end of the wiper rod.

To improve wiping quality, a spoiler is usually attached to the carrying element on both sides of the connecting part. The cap connects the two parts of the spoiler harmonically by the fact that it is connected to the parts by connecting profiles, thus essentially forming a continuous spoiler with good flow conditions for the slip stream. The wiper rod has a shallow rectangular cross-sectional profile, the long side of which runs approximately parallel to the windshield, so it supports the function of the spoiler when it is arranged on the oncoming flow side. The connecting part in the form of a sheet metal claw may be made of metal or plastic. It has a back running parallel to the carrying element, catch projections being integrally molded on the longitudinal sides of this back for simple assembly, so that it can be clipped across the carrying element. The connecting part has two side faces that face away from the carrying element. They have receiving openings for the pivot pin and are interconnected by a bearing tube when the pivot pin is rotatably mounted in the connecting part. The side faces have catch recesses or catch holes in which the catch noses of the cap engage to facilitate assembly of the cap. In addition, the cap may be held in place by a clip which surrounds the bearing tube. The cap may additionally be secured by a free end of the pivot pin protruding above the side face and engaging in a recess in the side wall of the cap.

The wiper rod may run above the pivot pin, in the same plane as the pivot pin or beneath the pivot pin. In the first case or the second case, it is expedient for the end that protrudes beyond the pivot pin to be bent or beveled toward the rubber profile of the wiper blade, so that the cap with its pocket can be designed to be lower. In the third case, the wiper rod may be designed to be straight. It creates particularly favorable oncoming flow conditions because it lengthens the underneath side of the spoiler profile and is only a short distance away from the windshield.

If the pivot pin is rotatably mounted in the connecting part, it is fixedly connected to the wiper rod at an end which protrudes out of the connecting part. This connection may be a material connection, e.g., a connection formed by welding, or a form-fitting or friction-locked connection, e.g., formed by riveting, pressing or the like.

According to one embodiment of this invention, on the end that is provided for the wiper rod, the pivot pin has a flat head in which there are rivet holes for rivets. In this case the wiper rod has corresponding rivet holes and is riveted to the pivot pin. In another embodiment, the pivot pin has a flat head with an integrally molded polygon, e.g., a triangular, quadrangular or hexagonal shape protrudes across the pivot pin, is pressed into a corresponding opening on the wiper rod and is secured on its projecting end by wobble riveting. Wobble riveting is a riveting method in which the riveting tool executes a wobble motion during riveting. Before assembly, the wiper rods and heads of the pivot pins are painted black.

In another embodiment, the pivot pin has a head with a slot to accommodate the flat wiper rod which is secured in the slot by means of a cross pin or a rivet. As an alternative to that, the wiper rod may have a hub in the area of the pivot pin, encircling the pivot pin and being secured on it by a cross pin.

According to another embodiment, the flat wiper rod is rotated by approximately 90° at the end so that a wide side of one end lies across the pivot pin. The end has a receiving bore for a pivot pin with a collar to which a flanged seat is connected, the receiving bore being pressed onto it and the seat being secured by a tamped disk. The end protruding beyond the pivot pin is beveled toward the rubber profile of the wiper blade and engages in a respective pocket of the cap. This embodiment has a short design length of the pivot pin, but the advantageous position of the wiper rod with respect to the spoiler is nevertheless retained in most of the area of the wiper rod.

BRIEF DESCRIPTION OF THE DRAWINGS

Additional advantages are derived from the following description of the drawings, which illustrate exemplary embodiments of the present invention. The drawings, the description and the claims contain numerous features in various combinations. Those skilled in the art will also expediently take the features into account individually and combine them to form other appropriate combinations. They show:

DETAILED DESCRIPTION

Figure 1:
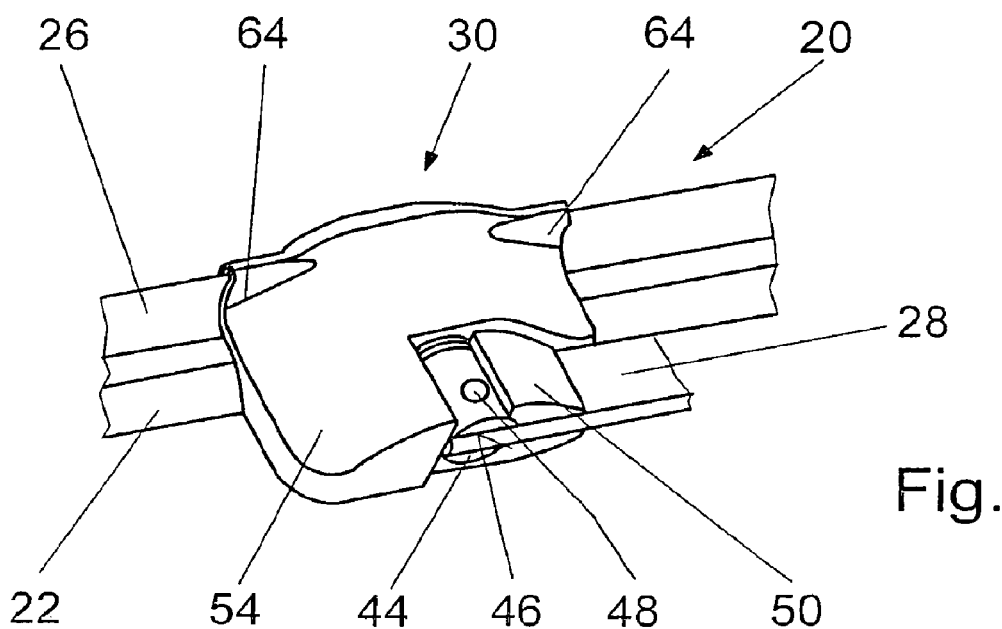
FIG. 1 a perspective partial view of an installed wiper blade as seen from above, FIG. 2 essentially a view according to FIG. 1, but without the cap, FIG. 3 a perspective partial view of a cap according to FIG. 1 with a wiper rod and a pivot pin as seen from underneath, FIG. 4 a side view of a wiper blade and a wiper rod bent toward the rubber profile at the end, FIG. 5 a side view of a wiper blade and a straight wiper rod running beneath the pivot pin, FIG. 6 a variant of FIG. 5, FIG. 7 a side view of a wiper blade and a wiper rod, the end of which runs so that it is rotated by 90° about its longitudinal axis and its part which protrudes beyond the pivot pin is beveled toward the rubber profile, FIG. 8 a wiper rod with a pivot pin according to FIG. 7 as seen from above, FIG. 9 a pivot pin according to FIG. 8, FIG. 10 a perspective top view of a wiper blade and a wiper rod in a detail, where the free end is designed like a fork and cooperates with a guide pin on the cap, FIG. 11 a variant according to FIG. 10, but without the cap, FIG. 12 a side view of a wiper blade and a straight wiper rod which runs beneath the pivot pin and is guided in front of the pivot pin in a pocket in the cap on the drive side of the wiper arm, FIGS. 13 and 14 variants of FIGS. 12, FIG. 15 a perspective partial view of the embodiment according to FIG. 14, as seen from above but without the cap, FIG. 16 a pivot pin according to FIG. 15, FIG. 17 a pivot pin according to FIG. 18, FIG. 18 a perspective partial view of a wiper arm and a wiper blade with a pivot pin according to FIG. 17 as seen from beneath, FIG. 19 a perspective view of a cap as seen obliquely from above, FIG. 20 a pivot pin fitting a cap according to FIG. 19, FIG. 21 a variant of FIG. 20, FIG. 22 a perspective partial view of a wiper blade with a connecting piece and a pivot pin secured on it, as seen from above, FIG. 23 a view of an embodiment according to FIG. 22, with a wiper rod obliquely from beneath, FIG. 24 a perspective view of a cap with a wiper rod for an embodiment according to FIG. 22 from beneath, FIG. 25 a variant of FIG. 25 and FIG. 26 a pivot pin according to FIG. 25.

An unarticulated wiper blade 20 has a rubber profile 22 which is attached to a flat carrying element 24, usually consisting of one or two spring strips embedded in the top part of the rubber profile 22. For articulated connection of the wiper blade 20 to a wiper rod 28 of a wiper arm (not shown in detail here), a joint 30 is provided in the middle area of the wiper blade 20. This joint has as a connecting part a sheet metal claw 32, the back 34 of which spans the carrying element 24 and is attached to it with catch noses 36. The catch noses 36 can be pushed over the carrying element 24 in the longitudinal direction or designed as a clip connection and clipped across the carrying element 24 by elastic deformation. Between the catch noses 36, which are provided laterally on the ends of the sheet metal claw 32, side faces 38 are a distance away from the rubber profile 22 on the longitudinal sides 66 of the sheet metal claw 32. They hold a bearing tube 40 which runs across the wiper blade 20 and runs approximately parallel to a windshield (not shown). A pivot pin 42 is inserted into the bearing tube 40 and protrudes with a head 44 out of the bearing tube 40 on one side toward the wiper rod 28.

Figure 2:
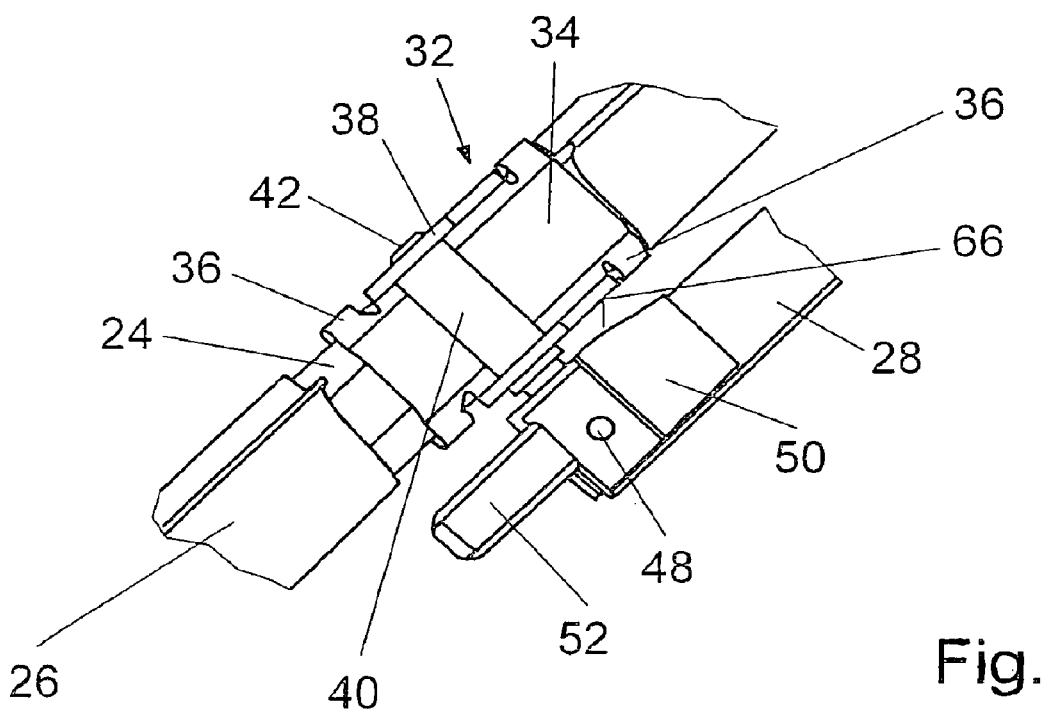
Figure 3:
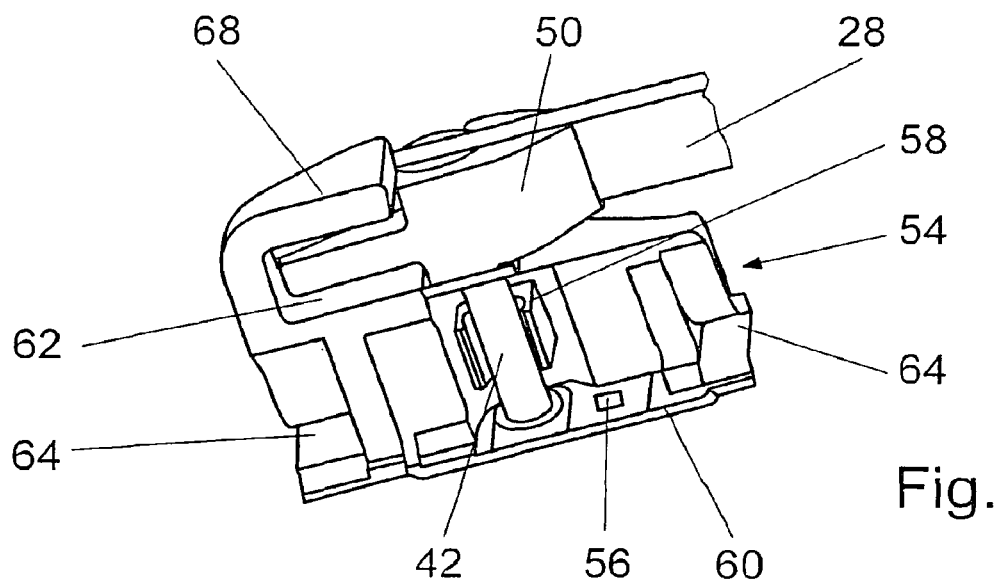

The wiper rod 28 has a rectangular cross section, with the longer sides running approximately parallel to the pivot pin 42. In the embodiments according to FIGS. 1 through 3, the wiper rod 28 engages in the slot 46 on the head 44 of the pivot pin 42 and is secured by a cross pin 48. The wiper rod 28 protrudes beyond the slot 46 with a finger 52. The finger 52 is narrower than the wiper rod 28 and is situated on the side of the wiper rod 28 which faces the wiper blade 20.

When seen in the longitudinal direction, the parts of a spoiler 26 are attached to the carrying element 24 on both sides of the sheet metal claw 32, thus increasing the pressing force on the windshield due to the slip stream when there is an oncoming flow from driving. The sheet metal claw 32 is covered by a cap 54, which is harmonically contiguous with the parts of the spoiler 26 with the connecting profiles 64. The cap 54 is detachably attached to the sheet metal claw 32. To this end, it has catch noses 56 on the inside of its side walls 60, engaging in corresponding openings 104 (FIG. 11) and/or recesses in the sheet metal claw 32. In its central area, it also has a clip 58 for fastening onto the bearing tube 40. The pivot pin 42 protrudes at its end which faces away from the head 44 (FIG. 2) beyond the side face 38, where this end engages in a recess in the side wall 60 of the cap 54 (FIG. 3) and thus supports its hold on the sheet metal claw 32.

On the side of the wiper rod 28, the cap 54 has a pocket 62 which is open toward the windshield (FIG. 3), the finger 52 of the wiper rod 28 engaging in said pocket in the operating position, in which the wiper blade 20 is in contact with the windshield. An outside wall 68 of the pocket 62 prevents the wiper rod 28 with its finger 52 from moving outward, so that the pivot pin 42 is locked in the axial direction. The pocket 62 is largely covered by a cover 50 which sits on the pivot pin 42 and is in harmonic contact with the contour of the wiper rod 28 and the cap 54. The cover 50 is at the same time an impact protection and/or damping element. It prevents damage to the windshield if the wiper arm inadvertently strikes the windshield when changing the wiper blade 20.

Figure 4:
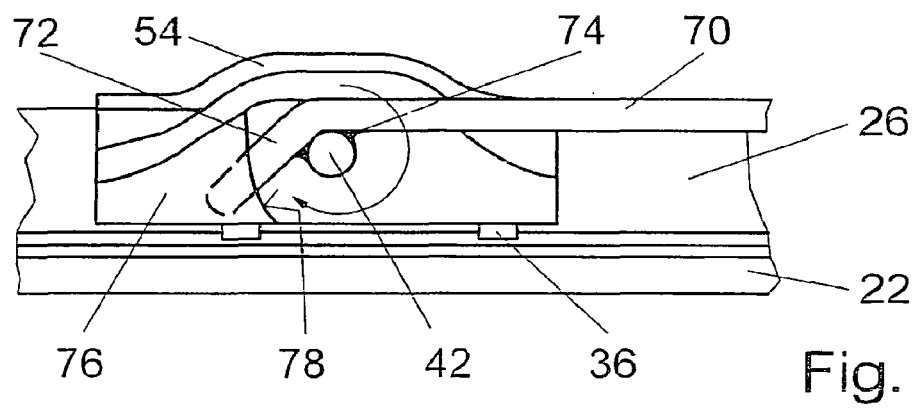
Figure 5:
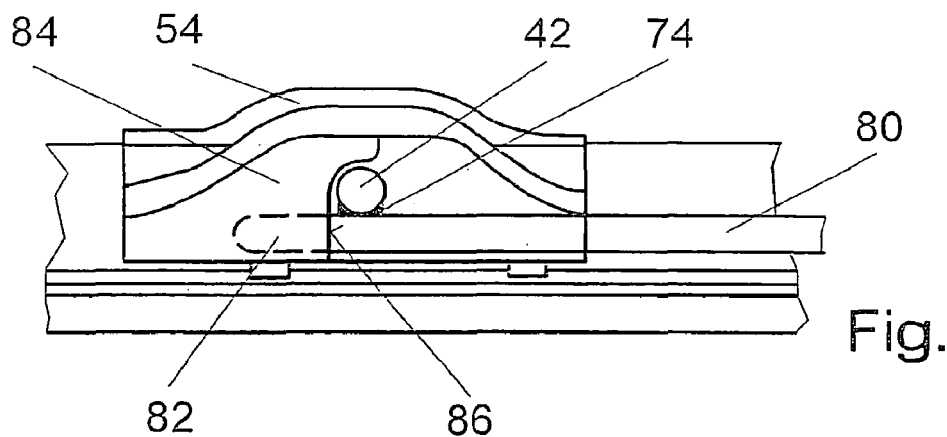
Figure 6:
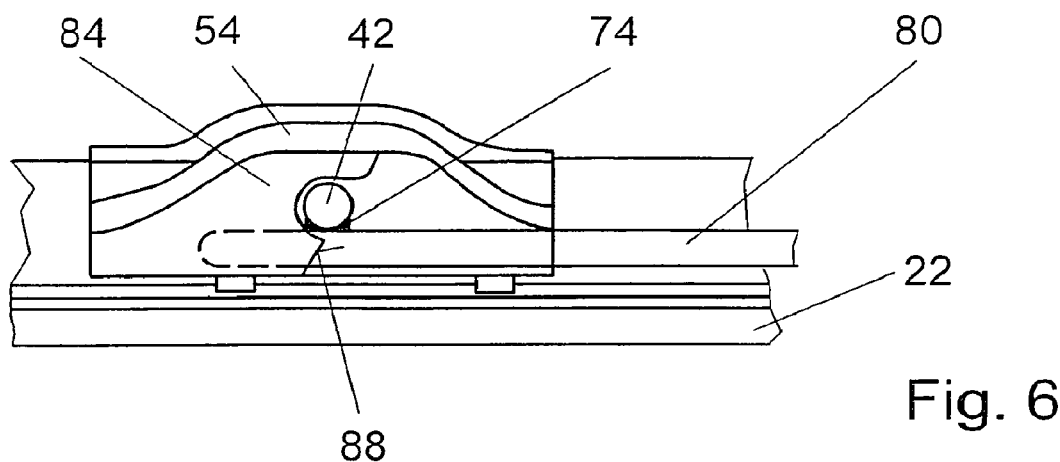

The descriptions of FIG. 4 through FIG. 6 show wiper rods 70, 80 which are attached to one end of the pivot pin 42 by means of welds 74. The wiper rod 70 according to FIG. 4 runs above the pivot pin 42 and protrudes at an end 72, which is bent toward the rubber profile 22, beyond the joint axle 42. The bent end 72 engages in a pocket 76 of the cap 54 when the wiper blade 20 is in the operating position shown here, where the edge 78 of the cap 54, which faces the wiper arm 70, runs so that the wiper blade 20 can easily be pulled away from the pivot pin 42 when in a position rotated by a approximately 90° in the direction of the arrow. In this position, the wiper blade 20 is also installed by placing it on the pivot pin 42 and then pivoting it in the opposite direction. The wiper blades 20 according to FIG. 1, FIGS. 5 through 7, FIG. 10 and FIG. 11 are installed and dismantled in the same way. Due to the bent end 72, the pocket 76 may be designed to be flat, so that the wind resistance is reduced and the visual impression is improved.

The same effect is achieved when the wiper rod 80 runs beneath the pivot pin 42 in the embodiments according to FIG. 5 and FIG. 6 and its straight end 82 which is lengthened beyond the pivot pin 42 engages in a pocket 84 in the cap 54. Here again, the edge 86 of the pocket 84 is designed so that installation or dismantling is readily possible in the pivoted installation position. In the embodiments according to FIG. 4 and FIG. 5, the wiper blade 20 must be rotated by approximately 90° for installation, but in the embodiment according to FIG. 6, the wiper blade 20 can be installed and dismantled even at a smaller pivot angle. This is achieved by the fact that the edge 88 of the pocket 84 runs at a smaller angle to the longitudinal direction of the wiper blade 20.

Figure 7:
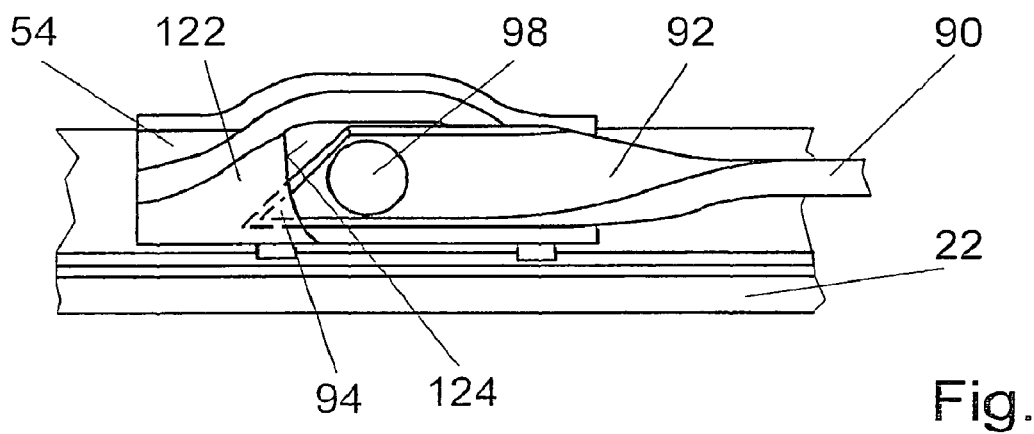
Figure 9:
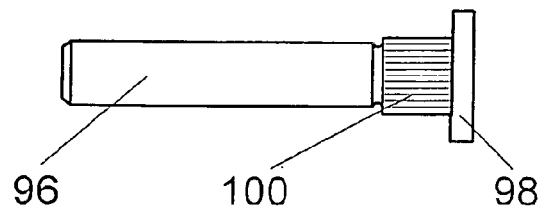

The embodiment according to FIG. 7 permits a very narrow joint 30 in that the wiper rod 90 is set at an angle of approximately 90° in the longitudinal direction at its end 92, so that in the area of the pivot pin 96, the longer sides of the rectangular profile of the wiper rod run across the pivot pin. The end protruding beyond the pivot pin 96 has a bevel 94, which is inclined toward the rubber profile 22 and engages with the bevel 94 in a pocket 122 of the cap 54. For installation and dismantling, the edge 124 of the pocket 122 is designed accordingly. The pivot pin 96 (FIG. 9) has a flanged seat 100 against which the wiper rod 90 is pressed up to a collar 98 with a receptacle opening and is secured by a washer 102.

Figure 10:
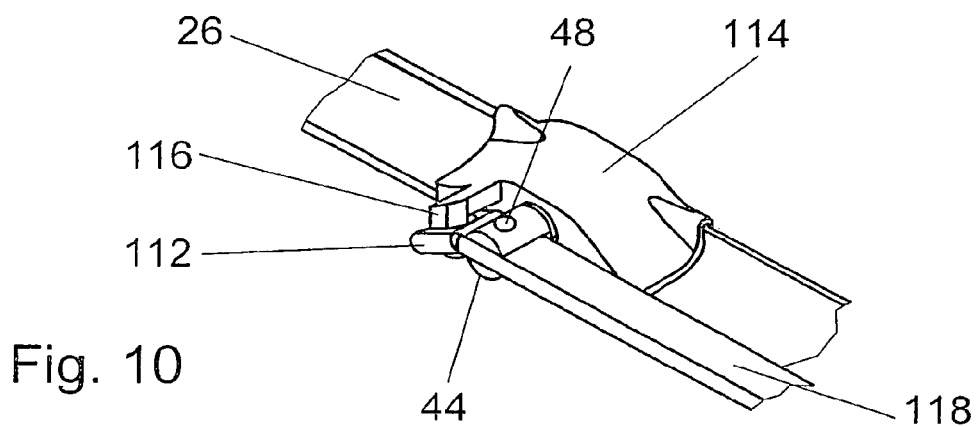
Figure 11:
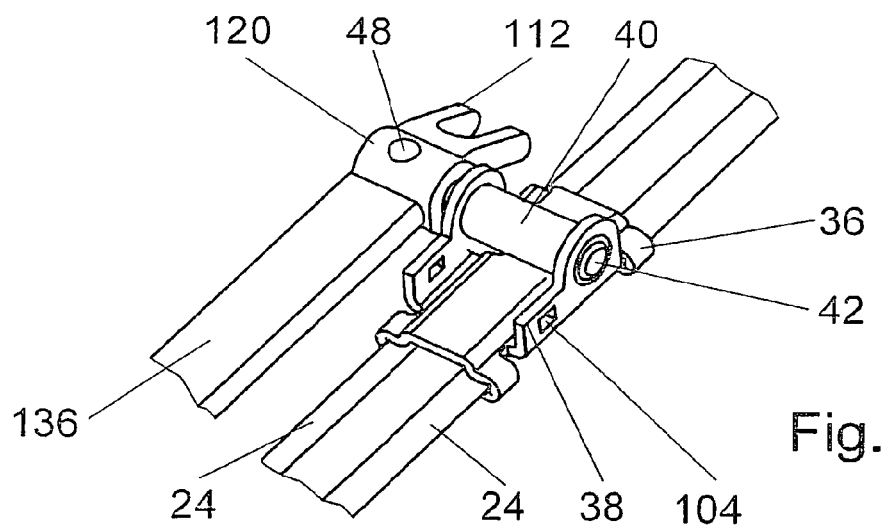

In the embodiments according to FIG. 10 and FIG. 11, the end of the wiper rods 118 protruding beyond the pivot pin 42 is designed as a fork 112 which in the operating position illustrated here holds a guide pin 116 of the cap 114. In order to be able to design the cap 114 to be flat, it is expedient for the fork 112 to be inclined toward the rubber profile 22. In the embodiment according to FIG. 1, the wiper rod 118 according to FIG. 16 engages in a slot 46 in the head 44 of the pivot pin 42 and is secured by a cross pin 48, but the wiper rod 118 according to FIG. 11 has a hub 120 which sits on the free end of the pivot pin 42 and is secured by a cross pin 48. Essentially the wiper rod 118, like the wiper rods in the embodiments described previously, may be welded to the pivot pin 42.

Figure 12:
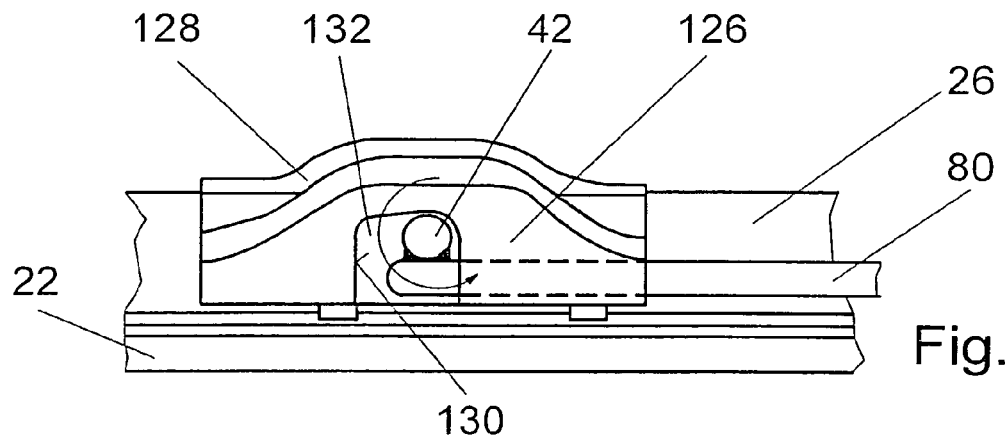
Figure 13:
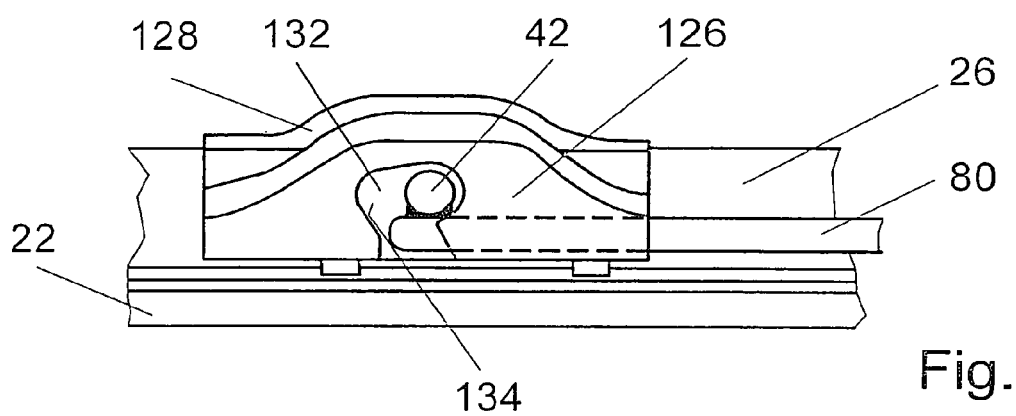
Figure 14:
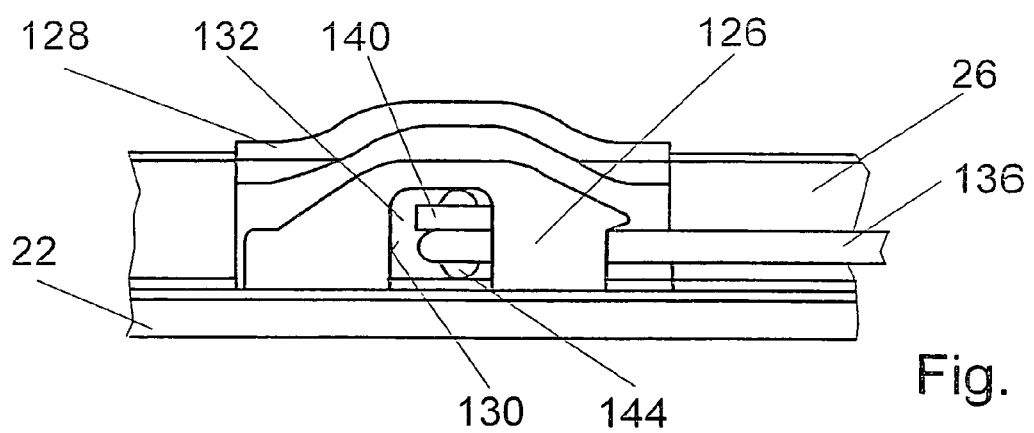

The embodiments according to FIG. 12 through FIG. 15 and FIG. 18 are identical to the embodiments according to FIG. 5 and FIG. 6. Here again, the wiper rods 80 and 136 run beneath the pivot pins 42 and/or 106 and 138. Although the wiper rod 80 according to FIG. 12 and FIG. 13 is welded to the free end of the pivot pin 42, the pivot pin 138 according to FIG. 14 and FIG. 15 has a flat head 140 with two rivet holes 142 connected by rivets 144 to the wiper rod 136 (FIG. 15). The pivot pin 106 (FIG. 17) has a flat head 108 with an integrally molded square shape 110, the head being pressed into a corresponding opening in the wiper rod 136 and optionally being riveted in a wobble [riveting] method (FIG. 18).

The caps 54 for the embodiments according to FIG. 12 through FIG. 15 and FIG. 18 have pockets 126 on the side facing the wiper rod 80, 136, said pockets encompassing the wiper rod 80, 136 on its dry side in front of the pivot pin 42, 106, 138, so that the wiper rod 80, 136 need not protrude beyond the pivot pin 42, 106, 138. This permits very flat designs for the wiper blades 20 whereby the cap 54 may be designed to be very flat and tight. Between the pocket 126 and the front part of the cap 128, only a small installation window 132 remains open in the exterior side wall. The installation windows 132 according to FIG. 12 and FIG. 14 have an edge 130 running approximately perpendicular to the rubber profile 22, but the edge 134 of the installation window 132 is inclined toward the rubber profile 22 according to FIG. 13, so that the wiper blade 20 may be installed and dismantled at an angle which is smaller than 90°. For dismantling, the wiper blade 20 must be pivoted in the direction of the arrow, as shown in FIG. 12.

Figure 8:
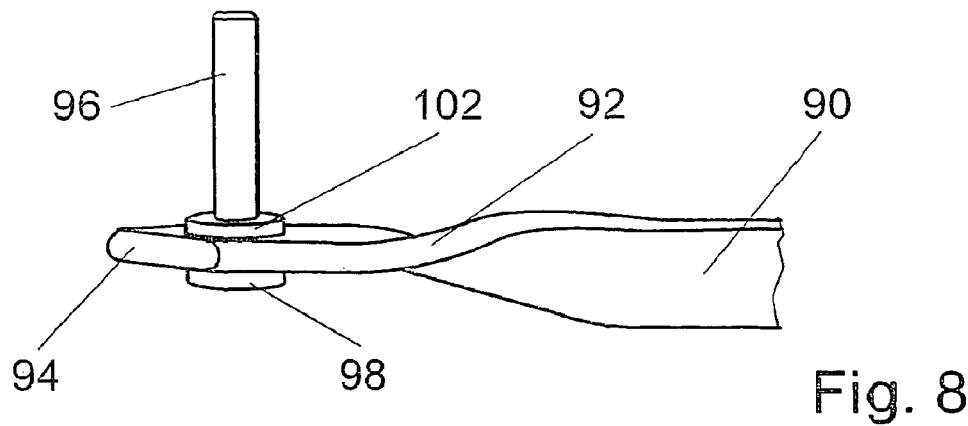
Figure 19:
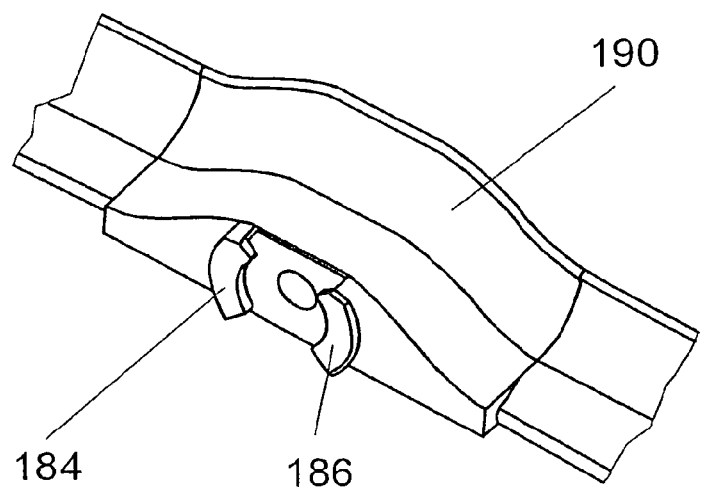
Figure 20:
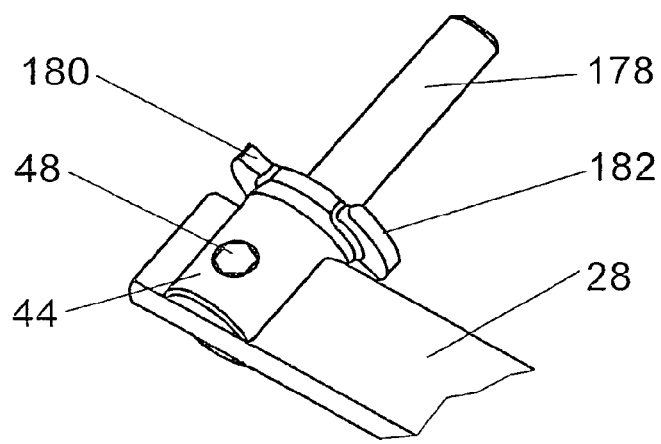
Figure 21:
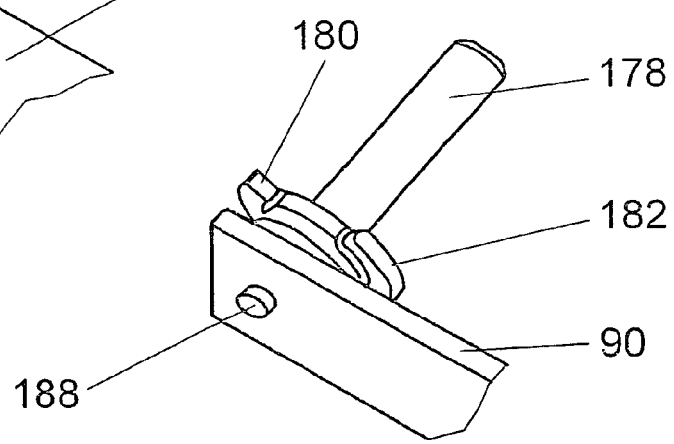
Figure 22:
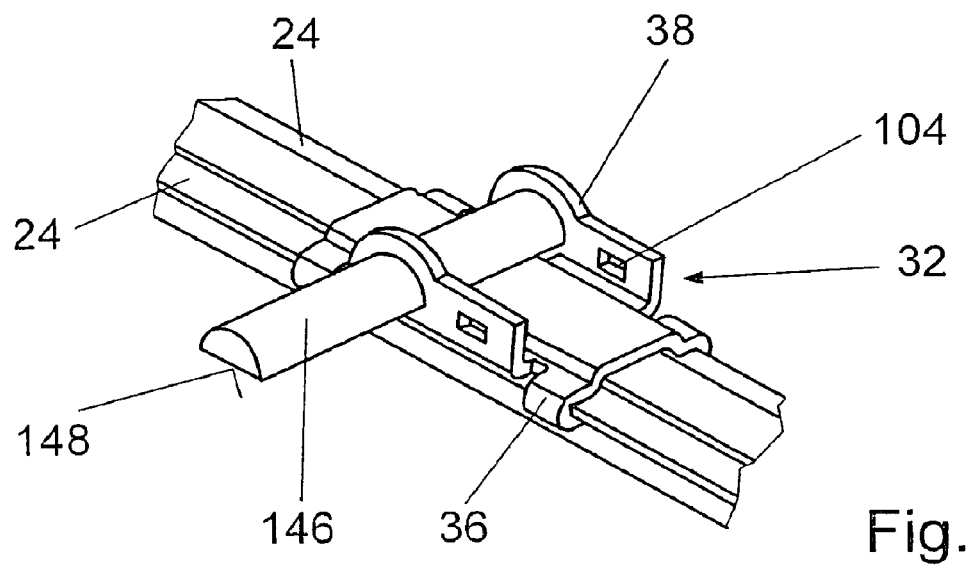

In another embodiment, the pivot pin 178 (FIGS. 20, 21) has two diametrically opposed wings 180, 182 facing the wiper rod 28, 90 and extending radially to the pivot pin 28, 90 [sic; 178] and in the longitudinal direction of the respective wiper rod 28, 90. The pivot pin 178 according to FIG. 20 like the pivot pin 42 according to FIG. 1 has a slot 46 in a head 44 into which the wiper rod 28 is inserted and secured by a cross pin, e.g., a rivet. The pivot pin 178 according to FIG. 21 has a rivet pin 178 [sic] on the end, with which it is attached to the wiper rod 90, which is rotated by 90° in the longitudinal direction like the wiper rod 90 according to FIG. 8. In both cases, in the installed position of the wiper blade 20, the wings 180, 182 engage in suitably aligned pockets 184, 186 of a pocket 190 (FIG. 19) in the manner of a bayonet closure. By rotating the wiper blade 20 by 90°, the bayonet closure can be released for dismantling or closed for installation.

Figure 23:
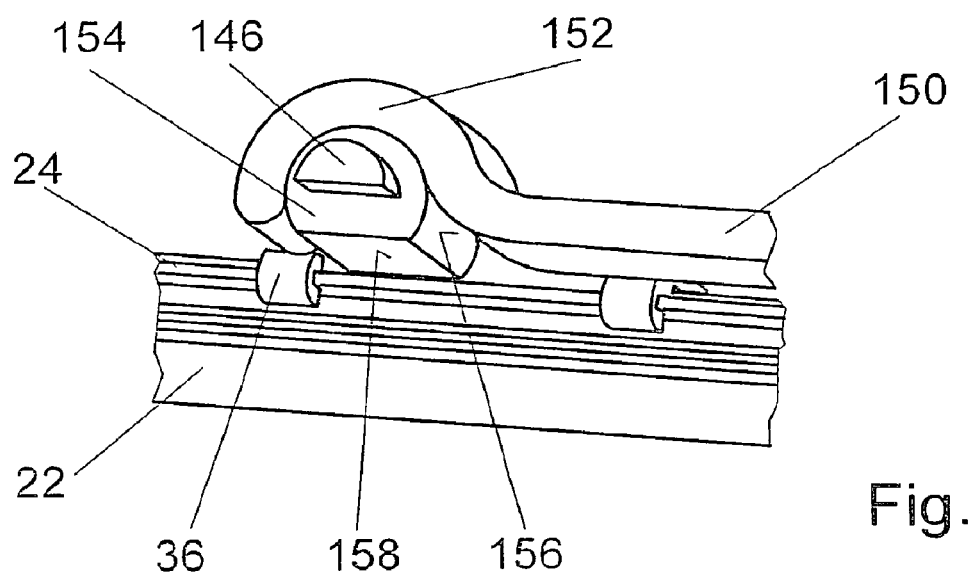

With the embodiments described so far, the pivot pin 46, 96, 106, 138 is rotatably mounted in the bearing tube 40 of the sheet metal claw 32 and is connected to the wiper rod 20, 70, 80, 90, 118, 136, but the pivot pin 146, 164 is in a rotationally fixed connection to the sheet metal claw 32 and is rotatably connected to the wiper rod 150, e.g., by being held in corresponding openings in the side faces 38 with an out-of-round cross-sectional profile in the form of a polygon or a flattened cylinder. In the embodiment according to FIG. 24, the pivot pin 146 has a half-round cross-sectional profile with a flattened surface 148 facing the rubber profile 22. It is inserted in a rotationally fixed manner into openings in the side faces 38 of the sheet metal claw 32 and on its end projecting laterally to the wiper rod 150, it carries a bearing bushing 154 in a rotationally fixed mount, said bushing having on its outer circumference a cylindrical area 156 and optionally having a flattened area 158 toward the rubber profile 22. A suitably bent end 152 of the wiper rod 150 is rotatably mounted on the bearing bushing 154 (FIG. 23). The bent end 152 may also be mounted directly on a round or half-round profile part of the joint shaft 146, 164. The bearing bushing 154 and the end 152 of the wiper rod 150 are guided in a bearing pocket 162 of a cap 160. The cap 160 is attached by means of catch noses 56 and a clip 58 on the sheet metal claw 32 and/or on the pivot pin 146. In addition, the pivot pin 146 protrudes beyond the bearing bushing 154 and engages in recess 176 in the cap 160. The wiper blade 20 may be installed on the wiper rod 150 by rotating it with the installed cap 160 to the extent that the bent end 152 can be threaded between the cap 160 and the bearing bushing 154.

Figure 24:
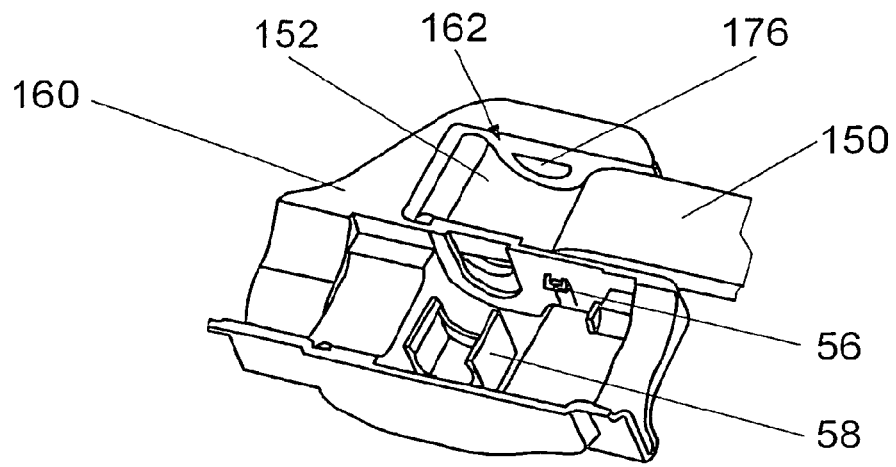
Figure 25:
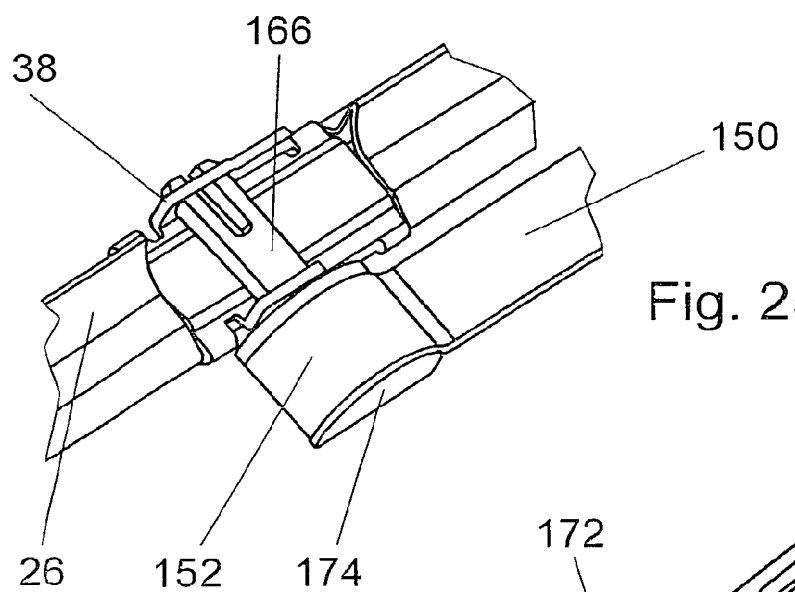
Figure 26:
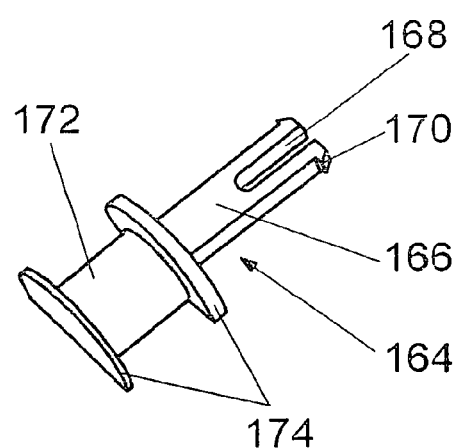

The variant according to FIG. 24 has a pivot pin 164 with a fastening area 166 which has an essentially rectangular cross section and a longitudinal section 168 running across the longer sides. The longer sides of the cross-sectional profile run approximately parallel to the carrying element 24. On the outer sides, catch noses 170 are provided on the ends of the fastening area 166, protruding into an opening in the respective side face 38 and engaging with the edge of this opening. On the other end, the pivot pin 164 has a bearing area 172 which is bordered by two collars 174 in the axial direction. The bent end 152 of the wiper rod 150 is mounted on the bearing area 172 and is secured in the installed position via the bearing pocket 152 of the cap 160.

What is claimed is:

1. Wiper blade (20) with a connecting part (32) which is mounted on a carrying element (24) of the wiper blade (20) and has a pivot pin (178) of a joint (30) whose free end is connected to a wiper rod (28, 90), characterized in that the joint (30) includes a cap (190) which covers and is attached to the connecting part (32) and in an installed position it secures the wiper blade (20) and the wiper rod (28, 90) during operation, characterized in that the cap (190) has at least one pocket facing the wiper rod (28, 90), said at least one pocket being open toward the windshield, and characterized in that the pivot pin (178) has two diametrically opposed wings (180, 182) extending radially to the pivot pin (178) and in the longitudinal direction of the wiper blade (28, 90) and engaging in the installed state in correspondingly aligned lateral pockets (184, 186) of the cap (190) in the manner of a bayonet closure.

2. Wiper blade (20) according to claim 1, characterized in that a spoiler (26) is attached to the carrying element (24) in the longitudinal direction on both sides of the connecting part (32), the cap (190) being connected to a portion of the spoiler with a connecting profile (64).

3. Wiper blade (20) according to claim 2, characterized in that an oncoming flow side of the spoiler (26) is facing the wiper rod (28).

4. Wiper blade (20) according to claim 1, characterized in that the pivot pin (178) is rotatably mounted in the connecting part (34), which is designed as a sheet metal claw (32) and is attached to the carrying element (24) by means of catch noses (36) mounted laterally on its back (34).

5. Wiper blade (20) according to claim 4, characterized in that the sheet metal claw (32) has side faces (38) standing upward on its longitudinal sides (66), said faces being connected by a bearing tube (40) in which the pivot pin (178) is rotatably mounted.

6. Wiper blade (20) according to claim 5, characterized in that the cap (190) has a clip (58) in the area of the bearing tube (42) with which it is attached to the bearing tube (40) or the pivot pin (178).

7. Wiper blade (20) according to claim 5, characterized in that the pivot pin (190) protrudes on one end beyond a side face (38) of the sheet metal claw (32) and is attached to the wiper rod (28,90) in a rotationally fixed manner, while its other end protrudes slightly beyond the respective side face (38) and engages in a recess in the cap (190).

8. Wiper blade (20) according to claim 4, characterized in that the cap (190) is held on the sheet metal claw (32) by means of catch noses (56), which engage in catch recesses (104) in the side faces (38) of the sheet metal claw (32).

9. Wiper blade (20) according to claim 1, characterized in that the pivot pin (178) has a head (44) in the direction of the wiper rod (28), said head having a slot (46) to accommodate the wiper rod (28) which is secured in the slot (46) by means of a cross pin (48).

10. Wiper blade (20) according to claim 1, characterized in that the wiper rod (90) is rotated by approximately 90° about its longitudinal axis at its end which faces the pivot pin (96) so that its broad side runs across the pivot pin (96).

\* \* \* \* \*